(12) United States Patent
Foote et al.

(10) Patent No.: US 8,109,708 B2
(45) Date of Patent: Feb. 7, 2012

(54) TROLLEY FOR CARRYING LOADED RACK

(76) Inventors: Megan Foote, Janetville (CA); Laughlin Sumners, Janetville (CA)

( * ) Notice: Subject to any disclaimer, the term of this patent is extended or adjusted under 35 U.S.C. 154(b) by 0 days.

(21) Appl. No.: 12/591,652

(22) Filed: Nov. 25, 2009

(65) Prior Publication Data

US 2010/0129186 A1      May 27, 2010

(30) Foreign Application Priority Data

Nov. 26, 2008   (CA) ...................................... 2645261

(51) Int. Cl.
*B60P 3/00*        (2006.01)

(52) U.S. Cl. ........................................ 414/458; 414/495

(58) Field of Classification Search .................. 414/458
See application file for complete search history.

(56) References Cited

U.S. PATENT DOCUMENTS

2001/0008344 A1 *   7/2001   Lanciaux, Jr. ............. 294/67.33
* cited by examiner

*Primary Examiner* — Saul Rodriguez
*Assistant Examiner* — Willie Berry, Jr.

(57) ABSTRACT

The trolley includes a member which supports the shoe of a loaded rack. The member has a horizontal limb which extends beneath the shoe and first and second housings each having vertically adjustable casters. One of the housings is connected to the member while the other has a clamp for attaching the housing to the horizontal limb of the member. As the casters descend, the shoe rises with resulting raising of the foot from the floor on which the rack rests.

3 Claims, 3 Drawing Sheets

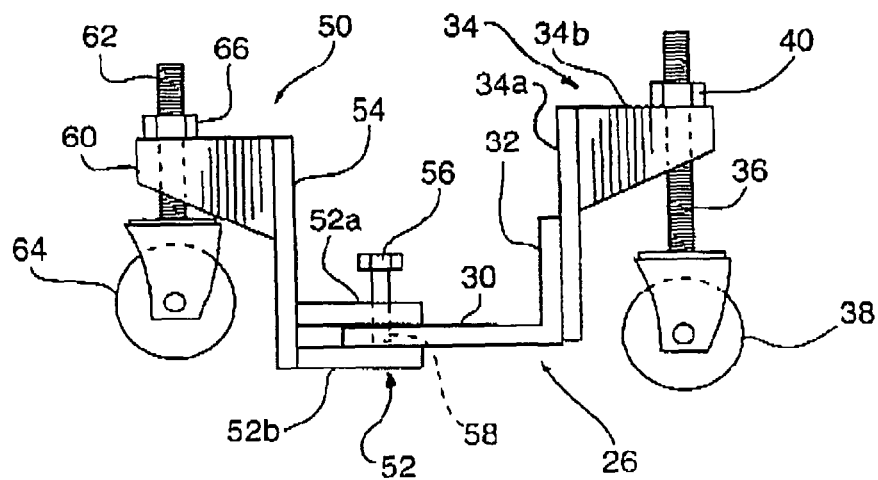
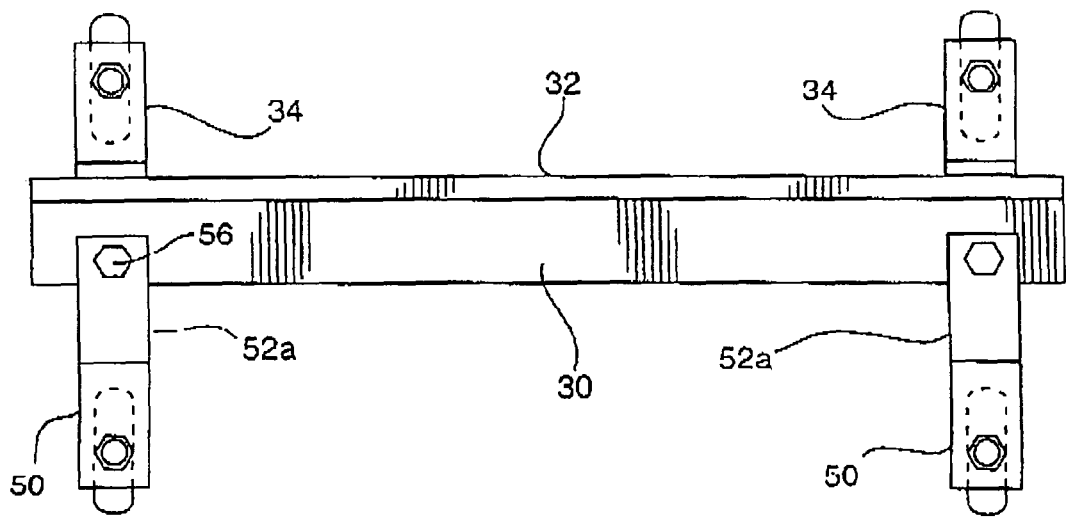

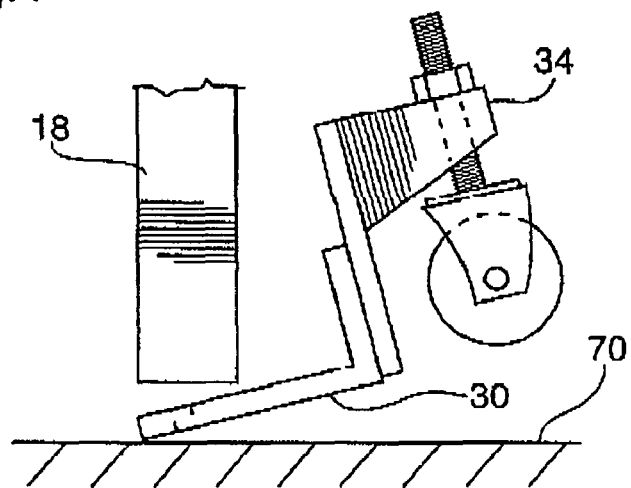
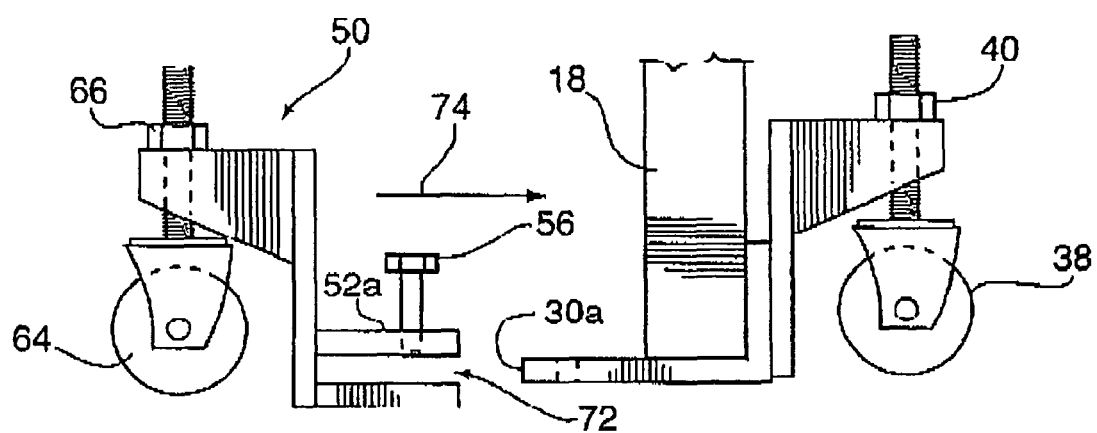

TROLLEY FOR CARRYING LOADED RACK

This application claims priority pursuant to 35 U.S.C. 119 based on Canadian application No. 2,645,261, filed Nov. 26, 2008, which application is incorporated herein by reference in its entirety.

FIELD OF THE INVENTION

This invention relates to trolleys for carrying loads and more particularly to a trolley that comes apart for mounting beneath a loaded rack and reassembles to form a conveyance for transporting the rack while it remains loaded from one location to another.

BACKGROUND OF THE INVENTION

Racks for holding or storing items can be extremely heavy when fully loaded. They are usually quite safe as long as they are not moved but if they are moved, they become unstable and susceptible to toppling over. If they do topple over, the items on the rack are usually damaged or soiled and the racks themselves are damaged beyond repair. Moreover, because the racks are so unstable when they are being moved, they may suddenly, without warning, fall and cause injury or even death to a person in the path of the falling rack.

To avoid the risk of a rack toppling over during transport, a rack is usually unloaded before it is moved. Unloading and then reloading a fully loaded rack is very time consuming. As well, items on the rack may be mixed up at this time and further time must be spent in checking the items as they are being placed back on the rack to ensure that the items are in their rightful place.

We have invented a trolley that is designed to carry a heavily loaded rack. There is no necessity to move any of the items on the rack before the trolley is attached or while the rack is moved on the trolley. As well, there is no possibility that any of the items on the rack may be mixed up as a result of the move since the items are not moved from the rack during the move.

SUMMARY OF THE INVENTION

Briefly, the trolley of my invention includes a member which supports the shoe of a rack. The shoe-supporting member has a horizontal limb which extends beneath the shoe and first and second housings each having vertically adjustable wheels or casters. One of the housings is connected to the shoe-supporting member while the other has a clamp for attachment to the horizontal limb of the shoe supporting member. As the wheels or casters descend, the shoe supporting-member rises with resulting raising of the foot from the floor on which the rack rests. The trolley will then be resting on the wheels or casters and the rack can be moved by pushing or pulling it.

DESCRIPTION OF THE DRAWINGS

The trolley of the invention is described with reference to the accompanying drawings in which:

FIG. 2 is a side elevation of the shoe-supporting member;

FIG. 3 is a plan view of both the shoe-supporting member;

FIG. 4 is an elevation of the shoe-supporting member in the process of being placed beneath the shoe of a rack; and FIG. 5 is an elevation of the shoe-supporting member in which the first and second wheeled housings are interconnected.

DESCRIPTION OF PREFERRED EMBODIMENTS

Figure 1:
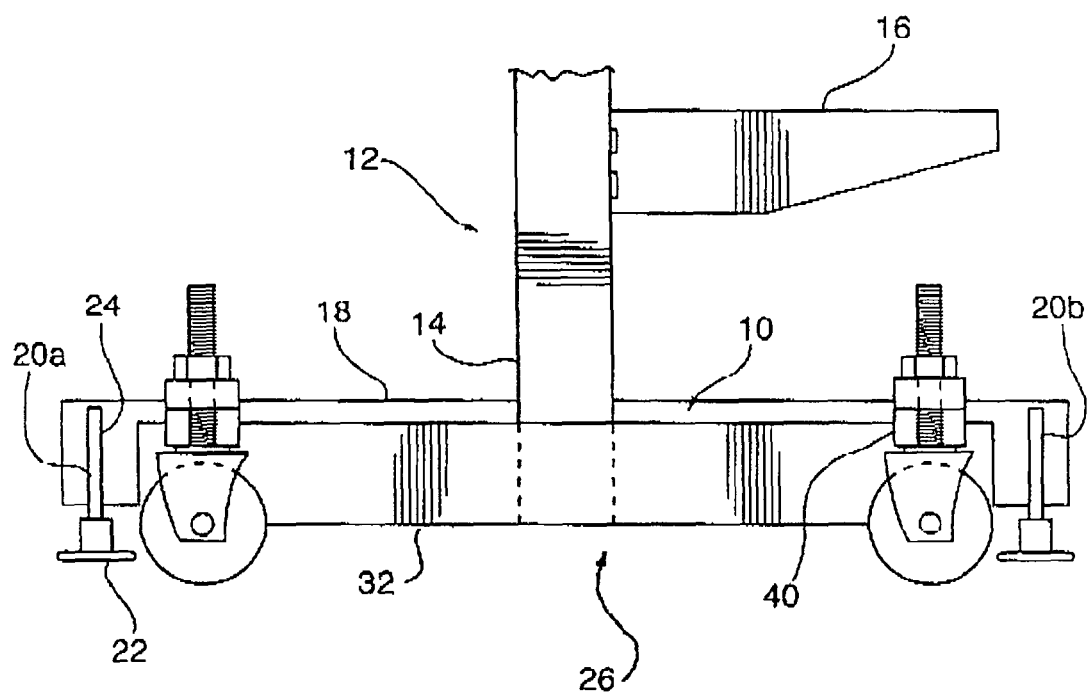
FIG. 1 is a front elevation of a shoe-supporting member of the trolley in conjunction with the lower portion of a conventional rack for storing or holding objects.

With reference to FIG. 1, a shoe-supporting member of the trolley, generally 10, is shown attached to the lower portion of a conventional rack generally 12. The rack is composed of a pair of spaced apart uprights 14, one of which being illustrated, to which a number of shelves 16 are removably attached. The lower end of each upright is attached to a shoe 18 which extends horizontally outward from opposite sides of the upright. Feet 20a,b are threadably attached to the shoe adjacent to its ends.

Each foot has a plate 22 which contacts a floor unless the rack is raised by the trolley of the invention in the manner described below. Extending upward from the plate is a threaded rod 24 which is attached to the shoe. As is conventional, when the rod is rotated, the level of the shoe either rises above a floor or descends toward the floor.

With reference to FIGS. 1, 2 and 3, the shoe-supporting member 10 has an L-shaped or angular member, generally 26 having a horizontal limb 30 and vertical limb 32. As illustrated in the Figures, the horizontal limb is in the form of a solid plate. Attached to the vertical limb adjacent to each of its ends a first wheeled housing, generally 34. The housing consists of a vertical plate 34a and an ear 34b to which a threaded vertically extending rod 36 is threadedly attached. A first caster or wheel 38 is attached to the lower end of each rod and is free to rotate and to swivel. A hexagonal nut 40 contacts the upper wall of each housing and is threadedly attached to the rod. Rotation of the nut causes the wheels or caster to rise and fall relative to the housing.

While the trolley of the invention can ride on either a simple wheel that does not swivel or a caster that does, a caster is preferred since a trolley equipped with castors is more easily turned than a trolley that is not. Henceforth the term "caster" will be used to describe the wheels on which the trolley of the invention rides but it is to be understood that the wheels can also be a simple wheels that do not swivel.

The L-shaped or angular member is slightly shorter than the distance between feet 20a,b so that wheeled housings 40 are adjacent to the two feet when connected to the shoe as described below.

A second wheeled housing, generally 50, has a jaw, generally 52, consisting of a pair of spaced apart upper and lower horizontal plates 52a,b attached to a vertical plate 54. A bolt 56 serves to removably attach the second wheeled housing to the horizontal limb. In this connection, a threaded opening is formed in both the upper plate 52a, and in the horizontal limb 30. When the bolt is turned until it passes through both openings and into contact with the upper face of the lower plate 52b, the two wheeled housings 34, 50 are interconnected. Further turning of the bolt causes horizontal limb 30 to rise in the manner described below.

As the horizontal limb rises it comes into contact with the lower face of the upper plate 52a with resulting clamping of the limb to the second wheeled housing 50. Loosening of the bolt causes it to move out of the opening in the horizontal limb so that the second wheeled housing can be separated from the horizontal limb.

The second wheeled housing 50, like the first wheeled housing has a vertical member 54 to which an ear 60 is attached. A threaded vertical rod 62 is threadably attached to the ear and a second caster 64 is attached to the lower end of the rod while a hexagonal nut 66 serves to adjust the elevation of caster 64 relative to the ear.

The operation of the trolley is described with reference to FIGS. 3-5. With reference first to FIG. 4, the trolley is attached to the rack by first inserting the horizontal limb 30 of the shoe-supporting member into the space between shoe 18 and a floor 70. The two first wheeled housings 34 at opposite ends of the horizontal limb should then be adjacent to a separate foot 20 of the rack and the two wheeled housings should be between the feet of the rack.

The feet of conventional racks are usually spaced about 3 feet apart. The first wheeled housings must fit between the feet and should be about 2'-6" apart. If the trolley of the invention is used to move racks in which the spacing between the feet is different from the conventional spacing, plates 34a of the housings should not be permanently attached to vertical limb 32 but should be bolted to it so that the spacing between the housings can be adjusted.

Two second wheeled housings 50 are then positioned adjacent to the first wheeled housings 34 as illustrated in FIGS. 3 and 5 so that jaws 52 are adjacent to the forward edge of the horizontal limb 30 and each second wheeled housing is aligned with a separate first wheeled housing.

The next step is to raise the forward edge of the horizontal limb to the level of the space between the two plates 52a,b. That step can be accomplished using a crowbar. The second castor housing is then advanced toward the first wheeled housing to move the forward edge of the horizontal limb into the space between the two plates. Bolt 56 is then tightened to clamp the two wheeled housings together.

Hexagonal nuts 40, 66 are then turned to lower first and second castors 38, 64, respectively, until they contact the floor. They are further tighten to raise feet 20a,b of the rack off the floor as illustrated in FIG. 1. The weight of the rack is then borne by the four castors of the first and second wheeled housings.

The process is then repeated at the other end of the rack in order to raise the feet at that end off the floor. The rack is then wholly supported by two trolleys, one at each at each end of the rack. The rack is then ready to be transported to a new location.

It will be understood, of course, that modifications can be made in the structure of the trolley of the invention without departing from the scope of the invention as defined in the appended claims. For example, the shoe-supporting member can be attached to either the first or second wheeled housing, either permanently or temporarily, by means of bolts. The other wheeled housing can then be provided with a clamp so that both can be attached to the shoe-supporting member.

We claim:

1. A trolley for use in conjunction with other like trolleys for transporting a rack having an upright resting on a plurality of spaced apart horizontally extending shoes, said shoes bearing substantially the entire weight of said rack and each being spaced apart from a floor by a pair of feet, said trolley including: a shoe-supporting member having a solid plate upon which one said shoe is adapted to be seated, said plate bearing the entire weight of said one shoe; first and second pairs of wheeled housings with each of said wheeled housings having selectively vertically adjustable first and second wheels or casters, respectively; said wheeled housings of said first pair of wheeled housings being connected to said shoe-supporting member at opposite ends thereof whereby said plate of said shoe-supporting member extends between wheeled housings of said first pair of wheeled housings, said second pair of wheeled housings having means for selectively each being clamped to said plate of said shoe-supporting member and when so clamped maintaining said plate in a horizontal position spaced above said floor, said plate ascending and descending as said first and second wheels or castors ascends and descends with resulting raising and lowering of said feet from and to said floor.

2. The trolley of claim 1 wherein said clamping means includes a pair of plates separated by a space within which a portion of said plate of said shoe-supporting member is removably accommodated.

3. A method of transporting a heavily loaded rack having a pair of spaced apart uprights each resting on a horizontally extending shoe, each said shoe being spaced apart from a floor by a pair of spaced apart feet and said shoes together bearing substantially the entire weight of said rack, said method including the steps of: (a) providing a trolley having (i) a shoe-supporting member having a solid plate upon which one said shoe is adapted to be seated, said plate bearing the entire weight of said one shoe; (ii) first and second pairs of wheeled housings each having selectively vertically adjustable first and second wheels or casters, respectively; and (iii) said wheeled housings of said first pair of wheeled housings being connected to said shoe-supporting member at opposite ends thereof whereby said shoe-supporting member extends between said wheeled housings of said first pair of wheeled housings while said wheeled housings of said second pair of wheeled housings each having means for being selectively clamped to said plate of said shoe-supporting member; (b) placing said wheeled housings of first pair of wheeled housings on said plate such that each said one of said wheeled housings of said first pair of wheeled housings is adjacent to a separate one of said feet; (c) positioning said wheeled housings of said second wheeled housing such that each is aligned with a separate said one of said wheeled housings of said first pair of wheeled housings; (d) clamping each of said wheeled housings of said second pair of wheeled housings to said plate of said shoe-supporting member; (e) lowering said wheels or casters of said first and second pairs of wheeled housings in order to raise said plate with resulting raising of said shoes off the floor; and (f) transporting said rack on said wheels or casters.

\* \* \* \* \*